United States Patent
Chen

(10) Patent No.: US 8,009,412 B2
(45) Date of Patent: Aug. 30, 2011

(54) DISPLAY APPARATUS AND METHOD FOR POSITIONING A DISPLAY PANEL

(75) Inventor: Kuan-Ting Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 203 days.

(21) Appl. No.: 12/329,624

(22) Filed: Dec. 7, 2008

(65) Prior Publication Data

US 2009/0147457 A1    Jun. 11, 2009

Related U.S. Application Data

(60) Provisional application No. 61/012,063, filed on Dec. 7, 2007.

(30) Foreign Application Priority Data

Sep. 16, 2008 (TW) .............................. 97135488 A

(51) Int. Cl.
G06F 1/16 (2006.01)
(52) U.S. Cl. .................................. 361/679.21; 713/186
(58) Field of Classification Search ............. 361/679.21; 713/186
See application file for complete search history.

(56) References Cited

U.S. PATENT DOCUMENTS

| | | | |
|---|---|---|---|
| 4,993,068 A * | 2/1991 | Piosenka et al. ............... 713/186 |
| 6,657,853 B2 * | 12/2003 | Oba et al. .................... 312/223.2 |
| 7,630,193 B2 * | 12/2009 | Ledbetter et al. .......... 361/679.21 |
| 2004/0156170 A1 * | 8/2004 | Mager et al. ................... 361/683 |
| 2006/0198097 A1 * | 9/2006 | Kuwajima et al. ............ 361/685 |
| 2007/0058329 A1 | 3/2007 | Ledbetter et al. |

FOREIGN PATENT DOCUMENTS

| | | |
|---|---|---|
| CN | 2578896 | 10/2003 |
| CN | 1553404 | 12/2004 |
| CN | 1667637 | 9/2005 |
| WO | 2006-087586 | 8/2006 |

OTHER PUBLICATIONS

"1st Office Action of China counterpart application", issued on Nov. 27, 2009, p. 1-p. 7.
"2nd Office Action of China Counterpart Application", issued on Sep. 27, 2010, p. 1-p. 6, in which the listed reference was cited.

* cited by examiner

*Primary Examiner* — Lisa Lea-Edmonds
(74) *Attorney, Agent, or Firm* — Jianq Chyun IP Office

(57) ABSTRACT

A display apparatus including a stand, a display panel, a location adjusting mechanism, a power switch and a biometric verification device is provided. The display panel is disposed on the stand. The location adjusting mechanism is disposed on the stand or the display panel and capable of adjusting relative positions of the display panel to the stand. The power switch is disposed on the stand or the display panel and electrically connected to the location adjusting mechanism. The biometric verification device is disposed on the stand or the display panel and electrically connected to the power switch. The biometric verification device identifies a biometric datum to activate the location adjusting mechanism via the power switch so as to drive the display panel to move relative to the stand according to the biometric datum.

10 Claims, 5 Drawing Sheets

DISPLAY APPARATUS AND METHOD FOR POSITIONING A DISPLAY PANEL

CROSS-REFERENCE TO RELATED APPLICATION

This application claims the priority benefit of U.S. provisional application Ser. No. 61/012,063, filed on Dec. 7, 2007. This application also claims the priority of Taiwan application serial no. 97135488, filed Sep. 16, 2008. The entirety of each of the above-mentioned patent applications is hereby incorporated by reference herein and made a part of this specification.

BACKGROUND OF THE INVENTION

1. Field of the Invention

The present invention relates to a display apparatus and a method for positioning a display panel and more particularly, to a display apparatus and a method for positioning a display panel which are capable of adjusting a position of the display panel according to identified biometric data.

2. Description of Related Art

In the modern informational and multimedia era, various types of display apparatus such as display apparatus of desktop personal computers or televisions have gradually become indispensable tools in people's daily life and work.

In general, a display apparatus of a desktop personal computer usually has an adjusting mechanism so that a user may adjust height and elevation angle of the display apparatus in relation to a stand according to the user's needs. However, different users usually have different usage habits. Therefore, when multiple users share a common display apparatus, users have to accommodate other users' usage habits. Otherwise, individual user has to adjust the height of the display panel relative to the stand and the elevation angle of the display panel each time when the user uses the display apparatus. For this reason, a display apparatus with automatic and customized adjustment means is therefore required.

SUMMARY OF THE INVENTION

The present invention provides a display apparatus capable of automatically adjusting a position of a display panel relative to a stand according to usage requirements of different users.

The present invention provides a method for positioning a display panel capable of automatically adjusting a relative position of a display panel to a stand according to usage requirements of different users.

The present invention provides a display apparatus including a stand, a display panel, a location adjusting mechanism, a power switch, and a biometric verification device. The display panel is disposed on the stand. The location adjusting mechanism is disposed on the stand or the display panel and is used to adjust a relative position of the display panel to the stand. Furthermore, the power switch is disposed on the stand or the display panel and is electrically connected to the location adjusting mechanism. In addition, the biometric verification device is disposed on the stand or the display panel and is electrically connected to the power switch. The biometric verification device is used to identify a biometric datum so as to activate the location adjusting mechanism via the power switch to drive the display panel to operate relative to the stand according to a set of user-defined configuration value that decide by the biometric datum.

In one embodiment of the present invention, the abovementioned stand includes a base plate and a bracket. The bracket is mounted on the base plate. The location adjusting mechanism is connected between the display panel and the bracket and is used to drive the display panel to move relative to the bracket. Furthermore, the abovementioned location adjusting mechanism may include a motor and a transmission element. The motor may be disposed on either the display panel or the bracket. The transmission element may be connected to the motor and transmit power thereof. The motor may drive the display panel to move relative to the bracket via the transmission element. In addition, the abovementioned transmission element may include at least one transmission belt, gear wheel, rack or chain.

In one embodiment of the present invention, the abovementioned stand includes a base plate and a bracket. The display panel is mounted on one side of the bracket. The bracket is pivoted to the base plate. The location adjusting mechanism may drive the bracket and the display panel to rotate relative to the base plate. Furthermore, the abovementioned location adjusting mechanism may include a motor and a transmission element. The motor may be disposed on one of the base plate and the bracket. The transmission element may be connected to the motor and transmit power thereof. The motor may drive the base plate to rotate relative to the bracket via the transmission element. Moreover, the abovementioned transmission element may include at least one transmission belt, gear wheel, rack or chain.

In one embodiment of the present invention, the abovementioned display apparatus further includes a storage unit. The storage unit is disposed on the stand or the display panel, electrically connected to the biometric verification device, and may store at least one set identification datum and user-defined configuration corresponding to the identification datum. The biometric verification device is used to compare a biometric datum with the identification datum and further causes the location adjusting mechanism to drive the display panel to move relative to the stand according to the user-defined configuration. The abovementioned user-defined configuration may comprise at least one of height of the display panel relative to the stand and an elevation angle of the display panel.

In one embodiment of the present invention, the abovementioned biometric verification device includes one of a fingerprint identification device, a palm prints identification device, and a palm vein identification device.

The present invention further provides a method for positioning a display panel including inputting a biometric datum to a biometric verification device and identifying the biometric datum. If the biometric verification device determines that the biometric datum is consistent with an identification datum, the display panel is then driven to move relative to a stand according to a user-defined configuration corresponding to the identification datum.

In one embodiment of the present invention, the abovementioned step of driving the display panel to move relative to the stand according to the user-defined configuration includes adjusting at least one of height of the display panel relative to the stand and an elevation angle of the display panel.

In one embodiment of the present invention, if the abovementioned biometric verification device determines that the biometric datum is inconsistent with the identification datum, the relative position of the display panel to the stand is maintained.

The display apparatus of the present invention includes a biometric verification device applicable to identify a biometric datum. Therefore, after a user's identity is identified, a relative position of the display panel and the stand may be automatically adjusted according to user's requirements.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
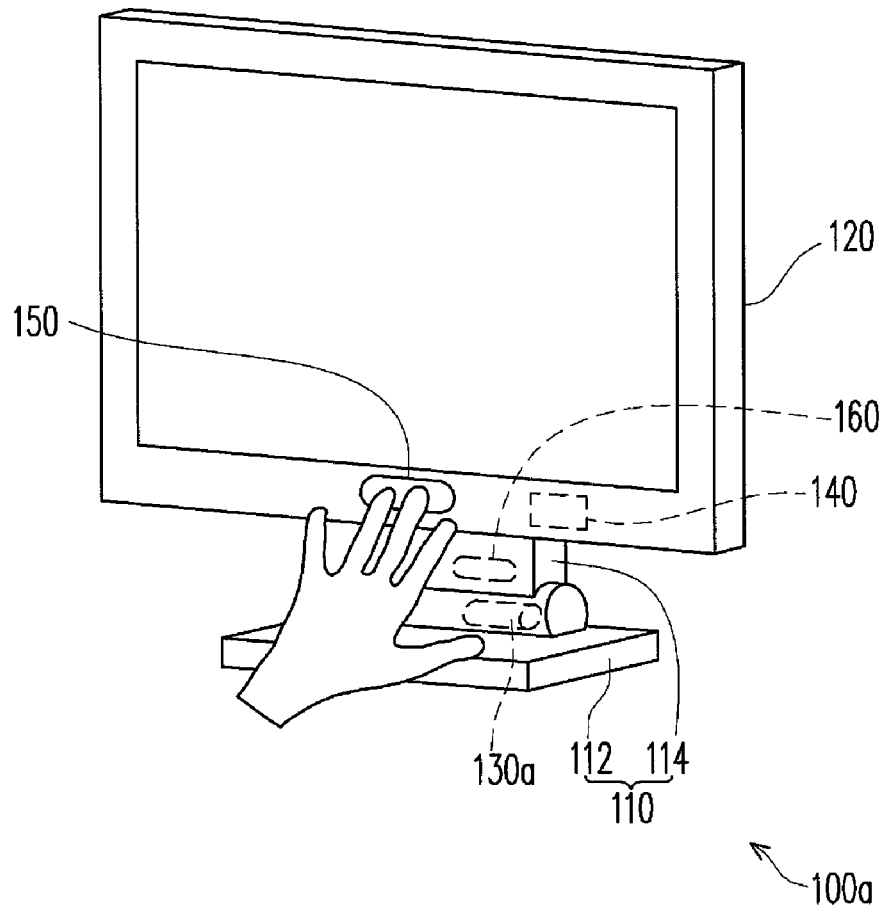
FIG. 1 is a schematic view of a display apparatus according to one embodiment of the present invention.
Figure 2:
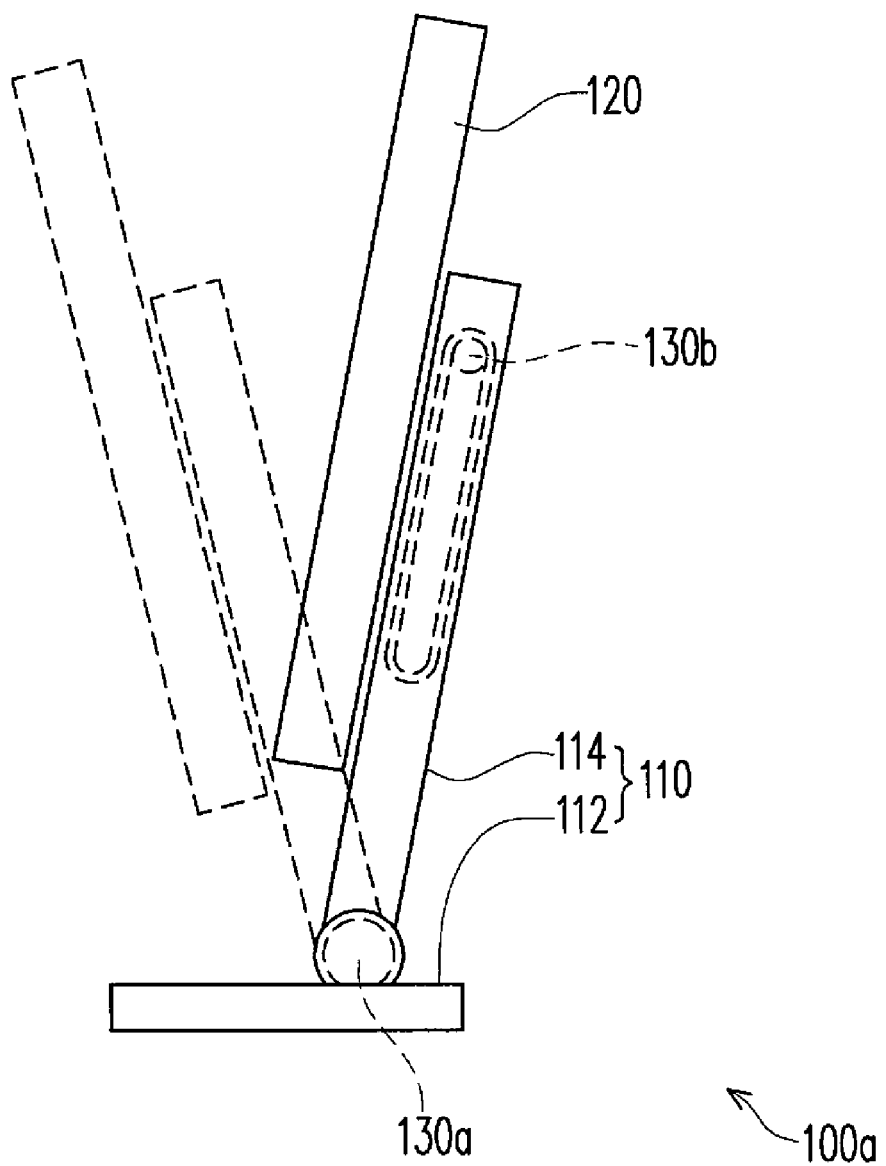
FIG. 2 and FIG. 3 are schematic views illustrating two methods of adjusting positions of the display panel of FIG. 1.
Figure 3:
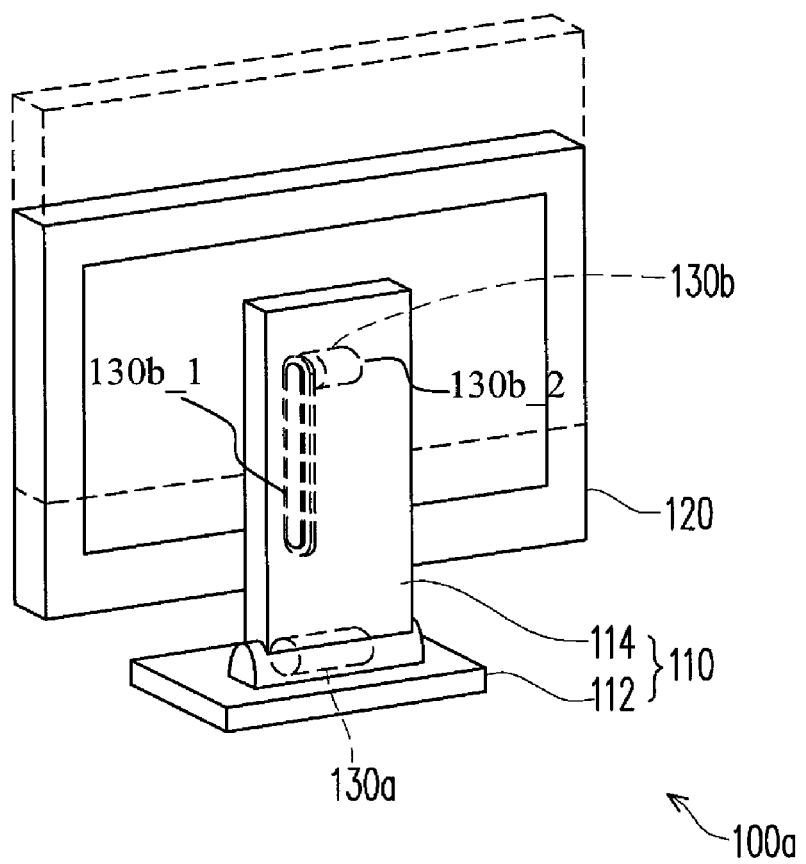

FIG. 1 is a schematic view of a display apparatus according to one embodiment of the present invention. FIG. 2 and FIG. 3 are schematic views illustrating two methods of adjusting positions of the display panel of FIG. 1. Referring to FIG. 1 and FIG. 2, a display apparatus 100a includes a stand 110, a display panel 120, two location adjusting mechanisms 130a and 130b, a power switch 140, and a biometric verification device 150. The display panel 120 is, for example, a liquid crystal display panel (LCD panel), an organic electro-luminescent display (OELD), a plasma display panel (PDP), or other display panels. The biometric verification device 150 is, for example, a fingerprint identification device.

Furthermore, the display panel 120 and the location adjusting mechanisms 130a and 130b are disposed on the stand 110. The power switch 140 and the biometric verification device 150 are disposed on the display panel 120. The power switch 140 is electrically connected to the location adjusting mechanisms 130a and 130b. The biometric verification device 150 is electrically connected to the power switch 140. Moreover, after identifying a biometric datum (e.g. fingerprints) of a user, the biometric verification device 150 activates the location adjusting mechanisms 130a and 130b via the power switch 140 so that the location adjusting mechanisms 130a and 130b may adjust a relative position of the display panel 120 to the stand 110 according to the biometric datum.

In addition, in other embodiments not shown in the figures, the power switch 140 or the biometric verification device 150 may be disposed on the stand 110. Alternatively, the power switch 140 and the biometric verification device 150 may together be disposed on the stand 110. The biometric verification device 150 may further be a palm prints identification device, a palm vein identification device, or other biometric verification devices which may respectively identify a user's palm prints, palm vein pattern, or other biometric data.

In the present embodiment, the stand 110 may include a base plate 112 and a bracket 114. The bracket 114 may be pivoted onto the base plate 112 and the display panel 120 may be mounted on one side of the bracket 114. The location adjusting mechanism 130a may drive the bracket 114 and the display panel 120 to rotate relative to the base plate 112 to adjust an elevation angle of the display panel 120.

Referring to FIG. 3, the location adjusting mechanism 130b may include a motor 103b_1 disposed on the bracket 114 and a transmission element 103b_2 connected between the display panel 120 and the motor 103b_1. The location adjusting mechanism 130b may drive the display panel 120 to move relative to the bracket 114 to adjust height of the display panel 120 relative to the stand 110. The transmission element 103b_1 may include at least one transmission belt, gear wheel, rack or chain and other common transmission elements.

Referring to FIG. 3, the location adjusting mechanism 130b may include a motor disposed on the bracket 114 and a transmission element connected between the display panel 120 and the motor. The location adjusting mechanism 130b may drive the display panel 120 to move relative to the bracket 114 to adjust height of the display panel 120 relative to the stand 110. The transmission element may include at least one transmission belt, gear wheel, rack or chain and other common transmission elements.

Referring to FIG. 1 and FIG. 2, the display apparatus 100a may further include a storage unit 160 which may be disposed on the bracket 114 of the stand 110 and electrically connected to the biometric verification device 150. In other embodiments not shown in the figures, the storage unit 160 may also be disposed on the display panel 120 or the base plate 112 of the stand 110. The storage unit 160 may store at least one set of identification datum established by a user (a plurality of identification data are illustrated in the present embodiment) and user-defined configuration corresponding to the identification datum. The plurality of identification data, for example, respectively corresponds to biometric data of a plurality of users. The plurality of location data may respectively represent height of the display panel 120 relative to the stand 110 and an elevation angle of the display panel 120. In addition, the biometric verification device 150 may compare the biometric data with the identification data so that the location adjusting mechanisms 130a and 130b may adjust a relative position of the display panel 120 to the stand 110 according to the corresponding location data.

More specifically, when a user enters his fingerprints to the biometric verification device 150, the biometric verification device 150 checks whether the fingerprints input by the user are consistent with the identification data stored in the storage unit 160. If the biometric verification device 150 determines that the fingerprints input by the user are all inconsistent with the identification data, the power switch 140 will not activate the display panel 120 and thus the display apparatus 100a has a function of maintaining confidentiality. Meanwhile, the power switch 140 also will not activate the location adjusting mechanisms 130a and 130b so a relative position of the display panel 120 to the stand 110 is maintained.

However, if the biometric verification device 150 determines that the fingerprints input by the user are consistent with one of the identification data stored in the storage unit 160, the power switch 140 will activate the display panel 120. Meanwhile, the biometric verification device 150 will read a user-defined configuration stored in the storage unit 160 corresponding to the identification datum. Afterwards, the location adjusting mechanism 130a will adjust an elevation angle of the display panel 120 according to the user-defined configuration (as shown in FIG. 2). The location adjusting mechanism 130b will adjust height of the display panel 120 relative to the stand 110 according to the user-defined configuration (as shown in FIG. 3).

Simply speaking, the display apparatus 100a of the present invention not only has the function of maintaining confidentiality but also may automatically adjust the relative position of the display panel 120 to the stand 110 according to the user's identity. Thus, the present invention provides convenient use as well as impressive and unique functions.

Figure 4:
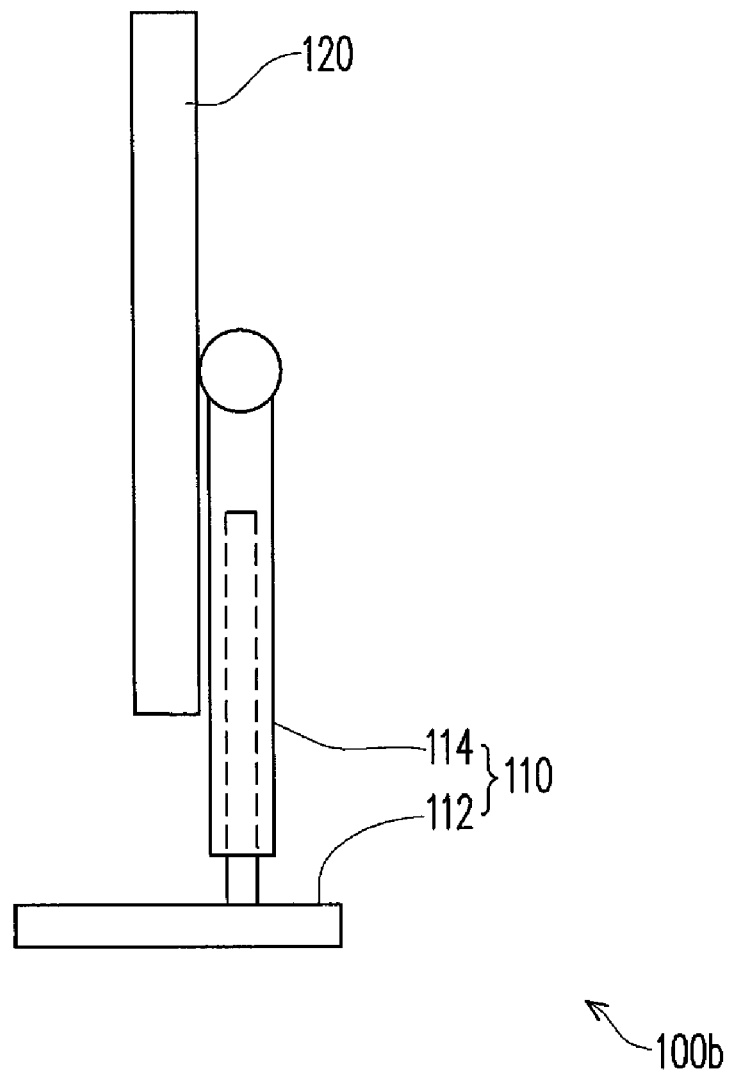
FIG. 4 and FIG. 5 are schematic views respectively illustrating the display panel at two positions according to another embodiment of the present invention.
Figure 5:
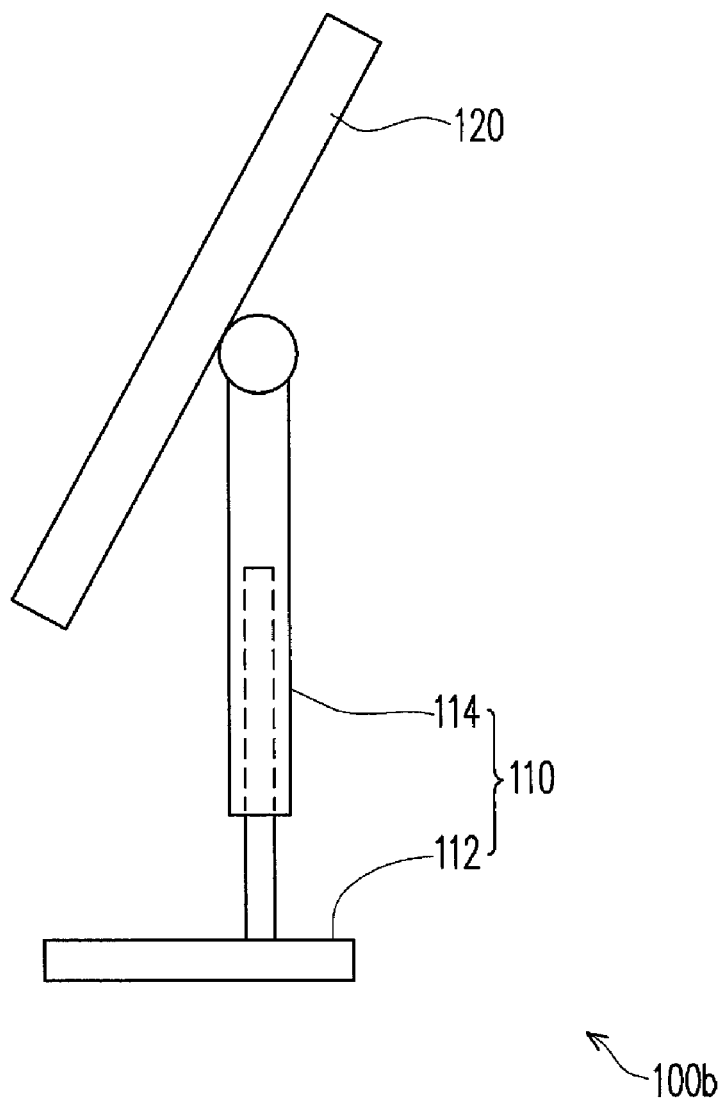

FIG. 4 and FIG. 5 are schematic views respectively illustrating the display panel at two positions according to another embodiment of the present invention. Referring to FIG. 4 and FIG. 5, in this embodiment, a bracket 114 of a display apparatus 100b is mounted on a base plate 112 and may move up and down relative to the base plate 112. A display panel 120 is pivoted on one side of the bracket 114. At this time, a location adjusting mechanism disposed between the bracket 114 and the base plate 112 may adjust height of the display panel 120 relative to the stand 110 while a location adjusting mechanism disposed between the bracket 114 and the display panel 120 may adjust an elevation angle of the display panel 120.

However, the present invention is not limited to the aforesaid embodiments. In other embodiments not shown in the figures, the display apparatus may only have one location adjusting mechanism. At this time, the display apparatus may only adjust relative height between the display panel and the stand, an elevation angle of the display panel, or other relative positions between the display panel and the stand according to user identity.

In summary, the display apparatus of the present invention has a biometric verification device which activates a power switch after identifying a user's identity so the display apparatus of the present invention has a function of maintaining confidentiality.

Furthermore, after the biometric verification device identifies the user's identity, a location adjusting mechanism automatically adjusts a relative position of the display panel to the stand according to a user-defined configuration corresponding to the user's identity. Thus, the present invention provides convenient use as well as impressive and unique functions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:
    a stand, comprising:
        a base plate; and
        a bracket is pivoted to the base plate;
    a display panel mounted on one side of the bracket;
    a location adjusting mechanism mounted on the stand or the display panel and used to drive the bracket and the display panel to rotate relative to the base plate;
    a power switch disposed on the stand or the display panel and electrically connected to the location adjusting mechanism; and
    a biometric verification device disposed on the stand or the display panel, electrically connected to the power switch and being used to identify a biometric datum;
    wherein the biometric verification device activate the location adjusting mechanism via the power switch to drive the display panel to move relative to the stand according to the biometric datum.

2. The display apparatus according to claim 1, wherein the location adjusting mechanism is also used to drive the display panel to move relative to the bracket.

3. The display apparatus according to claim 2, the location adjusting mechanism comprising:
    a motor, disposed on the bracket; and
    a transmission element, connected between the display panel and the motor, wherein the motor is used to drive the display panel to move relative to the bracket via the transmission element.

4. The display apparatus according to claim 3, wherein the transmission element include at least one transmission belt, gear wheel, rack or chain.

5. The display apparatus according to claim 1, further comprising a storage unit, disposed on the stand or the display panel, electrically connected to the biometric verification device, and used to store at least an identification datum and a user-defined configuration corresponding to the identification datum, wherein the biometric verification device is used to compare the biometric datum with the identification datum and further causes the location adjusting mechanism to drive the display panel to move relative to the stand according to the user-defined configuration.

6. The display apparatus according to claim 5, wherein the user-defined configuration comprises at least one of height of the display panel relative to the stand and an elevation angle of the display panel.

7. The display apparatus according to claim 1, wherein the biometric verification device comprises one of a fingerprint identification device, a palm prints identification device, and a palm vein identification device.

8. A method for positioning a display panel, comprising:
    inputting a biometric datum to a biometric verification device; and
    identifying the biometric datum, wherein if the biometric verification device determines that the biometric datum is consistent with an identification datum, the display panel is then driven to rotate relative to a stand according to a user-defined configuration corresponding to the identification datum.

9. The method for positioning a display panel according to claim 8, wherein driving the display panel to move relative to the stand according to the user-defined configuration comprises adjusting one of height of the display panel relative to the stand and an elevation angle of the display panel.

10. The method for positioning a display panel according to claim 8, wherein if the biometric verification device determines that the biometric datum is inconsistent with the identification datum, a relative position of the display panel to the stand is maintained.

* * * * *